(12) United States Patent
Dancel

(10) Patent No.: US 7,565,752 B2
(45) Date of Patent: Jul. 28, 2009

(54) AUTOMATIC GROUND SURFACE DRYER AND METHOD

(76) Inventor: Ivan Tumbocon Dancel, 723 Malibu Terrace, Ottawa, Ontario (CA) K2C 3T9

( * ) Notice: Subject to any disclaimer, the term of this patent is extended or adjusted under 35 U.S.C. 154(b) by 268 days.

(21) Appl. No.: 11/586,658

(22) Filed: Oct. 26, 2006

(65) Prior Publication Data
US 2008/0098611 A1   May 1, 2008

(51) Int. Cl.
*F26B 21/00* (2006.01)
(52) U.S. Cl. .................. 34/524; 34/528; 34/71; 34/95.3
(58) Field of Classification Search .......... 34/524, 34/528, 529, 60, 69, 70, 71, 95, 95.3, 397, 34/418, 443; 15/364, 401, 405, 98, 49.1
See application file for complete search history.

(56) References Cited

U.S. PATENT DOCUMENTS

| | | | |
|---|---|---|---|
| 4,133,072 A | 1/1979 | Face, Jr. | |
| 4,571,849 A | 2/1986 | Gardner et al. | |
| 5,212,848 A | 5/1993 | Geyer | |
| 5,533,577 A | 7/1996 | Jucker | |
| 6,049,943 A | 4/2000 | Carter | |
| 6,189,179 B1 | 2/2001 | Baird | |
| 6,298,578 B1 | 10/2001 | Frampton | |
| 2002/0108209 A1 | 8/2002 | Peterson | |
| 2004/0045122 A1 | 3/2004 | Paterson | |
| 2007/0234502 A1 * | 10/2007 | Brobeck | ........ 15/319 |

FOREIGN PATENT DOCUMENTS

| | | | |
|---|---|---|---|
| JP | 63196839 A | * | 8/1988 |
| JP | 2006335298 A | * | 12/2006 |

OTHER PUBLICATIONS

Grundahl, Mika; How it Works, An Electronic Eye Makes the Call, The New York Times, (nytimes.com), Aug. 31, 2000, 3pgs, USA.
Brown, Clifton; Higher Technology for Drier Courts to Prevent a Rain-Soaked Repeat, The New York Times, (nytimes.com), Aug. 30, 2004, 2 pgs, USA.

* cited by examiner

*Primary Examiner*—Jiping Lu
(74) *Attorney, Agent, or Firm*—Cassan Maclean

(57) ABSTRACT

An automatic ground surface dryer, system and method for automatically, conveniently, quickly and effectively drying a ground surface without the need for manual labor and capable of quickly drying a large ground surface is described. The automatic ground surface dryer has a frame, a drying apparatus mounted to the frame, a support for the frame to facilitate movement of the frame over the ground surface, a motor coupled to the frame to move the frame over the ground surface, and a controller coupled to the motor and the drying apparatus to drive the motor and to operate the drying apparatus in response to a rainfall data signal from a rainfall data gathering system which gathers rainfall data.

11 Claims, 15 Drawing Sheets

AUTOMATIC GROUND SURFACE DRYER AND METHOD

FIELD OF THE INVENTION

The invention relates generally to devices for drying ground surfaces and more particularly to devices for automatically drying large, flat ground surfaces such as sports fields or courts.

BACKGROUND

Outdoor sports fields and courts having hard surfaces, such as cement tennis courts, are generally not usable when wet: such ground surfaces are generally too slippery to provide acceptable playing conditions. Rain during professional sporting events can therefore be very disruptive and costly if the playing surface cannot thereafter be adequately dried in as little time as possible. Accordingly, there is a need for a device and a method to conveniently, quickly and effectively dry such ground surfaces.

In the past, such ground surfaces, and particularly hard surface tennis courts, have been dried by first removing the surface water manually using long-handled squeegees, sometimes followed by the application of absorbent materials such as towels, and by thereafter allowing the natural evaporation of the remaining moisture. Such methods are, however, cumbersome and time-consuming; adequate evaporation of the moisture can take several hours or longer in the humid, overcast conditions typically prevailing when the need for drying the ground surface arises.

A number of solutions attempting to overcome these disadvantages have been taught including those described in U.S. Pat. No. 6,298,578 to Frampton and U.S. Pat. No. 6,189,179 to Baird.

Frampton describes a method for drying a ground surface using an apparatus having a frame and, mounted on the frame, a water removal apparatus which removes water from a surface by suction and a heated air flow impinging on the surface to dry the surface. The apparatus has a frame, wheels and a handle arranged as in a convention "push" lawnmower. In one embodiment, the wheels of the apparatus are driven by a motor. However, the apparatus must be controlled and directed by an operator applying manual labour in a manner similar to that in the use of a conventional "push" lawnmower. In addition, the amount of time required to dry a ground surface area using this apparatus and method is limited by the size of the apparatus; furthermore, the size of the apparatus is limited by the need for the apparatus to be wieldy to the operator.

Baird describes a surface drying machine for drying a ground surface and, in particular, a paved race track. The apparatus has a housing containing rotating brushes for removing water from the surface and a blower for drying the surface. The apparatus has wheels. However, the apparatus is described as needing to be towed by another vehicle driven by an operator and is otherwise immobile. In addition, the amount of time required to dry a ground surface area using this apparatus and method is limited by the size of the apparatus; furthermore, the size of the apparatus is limited by the need for the apparatus to be wieldy to the towing vehicle in the space needing drying.

Both of the solutions taught by Frampton and Baird, therefore, suffer from the disadvantage that an operator must be present and manually operate the solution in order for it to work.

There is, accordingly, a need for an automatic ground surface dryer and method for automatically, conveniently, quickly and effectively drying a ground surface without the need for manual labour and which is capable of quickly drying a large ground surface.

BRIEF DESCRIPTION OF THE DRAWINGS

An understanding of the exemplary embodiments will be obtained from the following description, with reference to the following drawings in which.

Where appropriate, the same reference numerals are used in the drawings to indicate like features in all of the drawings.

DETAILED DESCRIPTION

Figure 1:
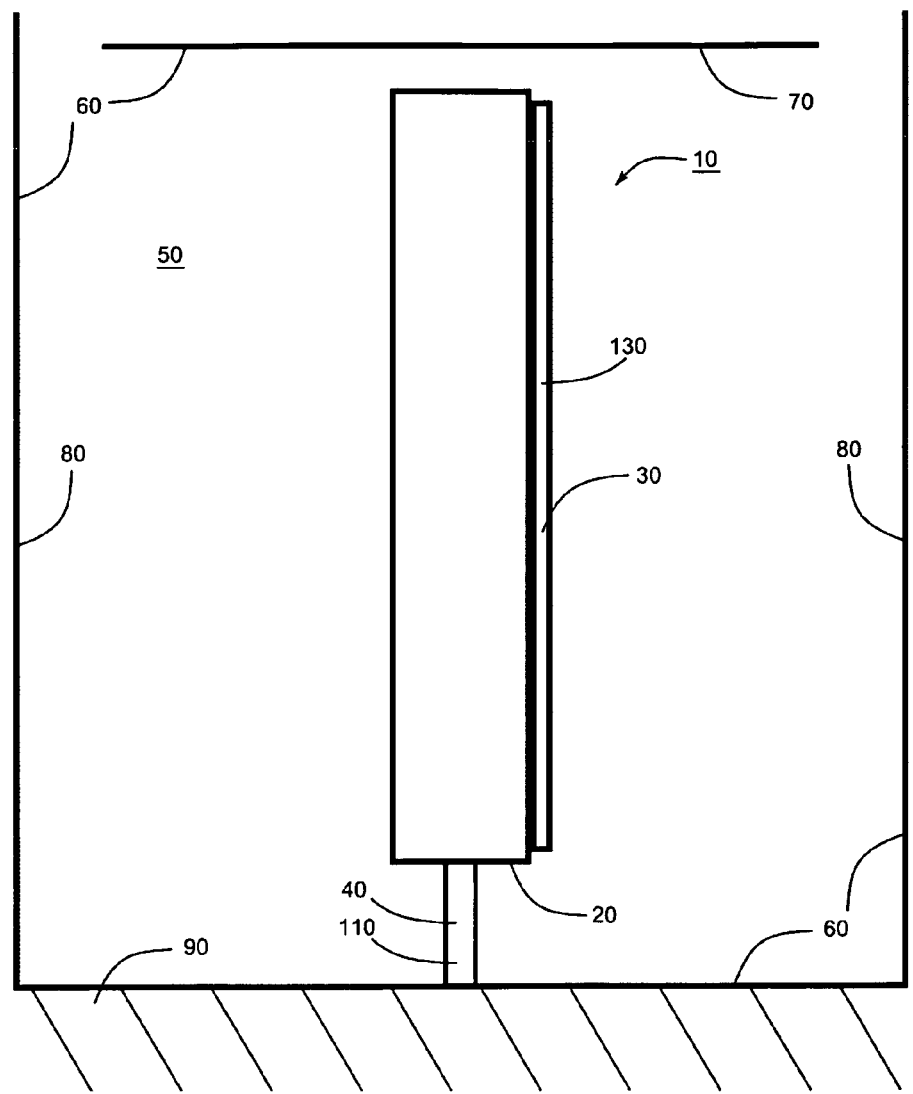
FIG. 1 shows a plan view of an automatic ground surface dryer.
Figure 2:
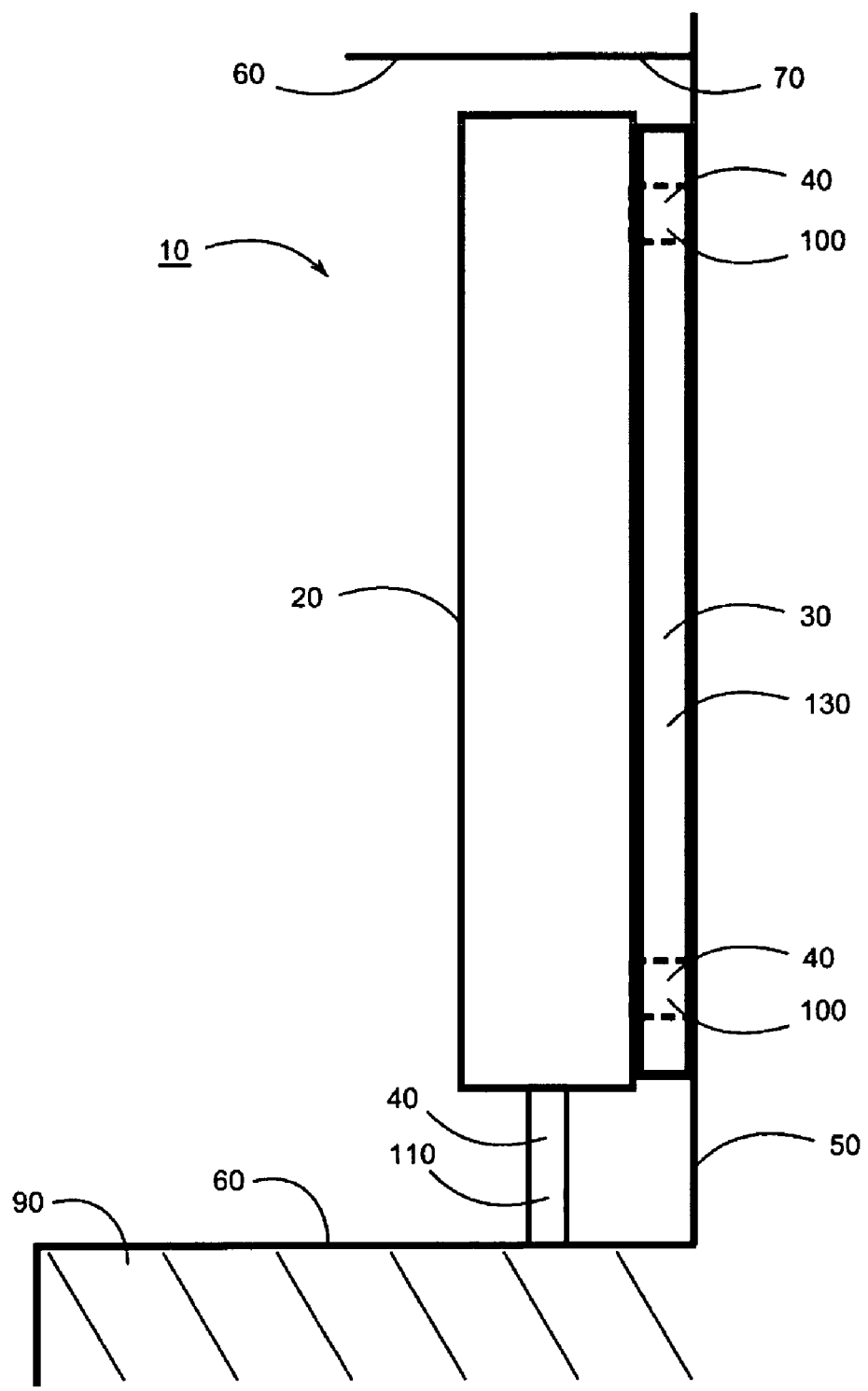
FIG. 2 shows a side view of an automatic ground surface dryer according to FIG. 1.

An automatic ground surface dryer for automatically, conveniently, quickly and effectively drying a ground surface without the need for manual labour and which is capable of quickly drying a large ground surface is described hereinafter. The automatic ground surface dryer is useful for drying any ground surface which is generally flat and generally solid, including a hard surface grass or clay tennis court, concrete, Astroturf™, Decoturf™ or asphalt. The automatic ground surface dryer is particularly useful for drying ground surfaces where time is of the essence such as in professional sports tournaments, and for such ground surfaces as hard surface tennis courts and running tracks.

The automatic ground surface dryer generally has a frame, a drying apparatus mounted to the frame, a support for the frame to facilitate movement of the frame over the ground surface, a motor coupled to the frame to move the frame over the ground surface, and a controller coupled to the motor and the drying apparatus to drive the motor and to operate the drying apparatus in response to a rainfall data signal from a rainfall data gathering system which gathers rainfall data. The automatic ground surface dryer may further have a brake coupled to the controller for stopping or slowing the motion of the automatic ground surface dryer.

Also described herein is an automatic ground surface dryer system for automatically drying a ground surface. The system has a frame, a drying apparatus, a support, a motor, a controller and a rainfall data gathering system. The drying apparatus is mounted to the frame and is for drying the ground surface. The support is also mounted to the frame, supports the frame and facilitates movement of the frame over the ground surface. The motor is also coupled to the frame and the support and moves the frame over the ground surface. The controller is coupled to the motor and the drying apparatus, and drives the motor and operates the drying apparatus in response to a rainfall data signal. The rainfall data gathering system gathers rainfall data and transmits the rainfall data signal. The controller automatically drives the motor and operates the drying apparatus when the rainfall data indicates that it has rained and that it is not presently raining.

A method of automatically drying a ground surface is also described herein. The method first comprises receiving a rainfall data signal indicating that it has started to rain from a rainfall data gathering system which gathers rainfall data. The method further comprises receiving a further rainfall data signal indicating that it is no longer raining from the rainfall data gathering system. The method further comprises automatically moving a drying apparatus over the ground surface to dry the ground surface in response to the rainfall data signal.

As shown in FIGS. 1 to 4, the automatic ground surface dryer 10 generally has a frame 20, a drying apparatus 30 mounted to the frame 20, and a support 40 for the frame 20 to facilitate movement of the frame over a ground surface 50. The drying apparatus 30 is for drying the ground surface 50.

The ground surface 50 generally has predetermined boundaries 60 which delimit the ground surface 50 to be dried. It is to be understood that the ground surface 50 may have any desired dimensions or boundaries 60, and that the boundaries 60 may selectively delimit the whole or any part of the ground surface 50 to be dried. The ground surface 50 may comprise any generally flat and generally solid surface including, but not limited to, the ground surfaces described herein, including hard surface grass, clay, concrete, Astroturf™, Decoturf™ or asphalt.

For illustrative purposes only, the ground surface 50 is shown in FIGS. 1 to 4 as being one half of a tennis court. In this case, the boundaries 60 of the ground surface 50 include a tennis net 70, two sides 80 each substantially adjacent and perpendicular to the tennis net 70, and a back wall 90 opposite and parallel to the tennis net 70. It is to be understood that the boundaries 60 may comprise any means to delimit the ground surface 50 to be dried which are appropriate to such ground surface 50. When used for drying a tennis court, two automatic ground surface dryers 10 may be employed, one on each half of the tennis court. Alternatively, the tennis net 70 may be removed, in which case a single automatic ground surface dryer 10 may be used and the ground surface 50 to be dried is defined by the opposing back walls 90 and sides 80 of the tennis court.

Figure 5:
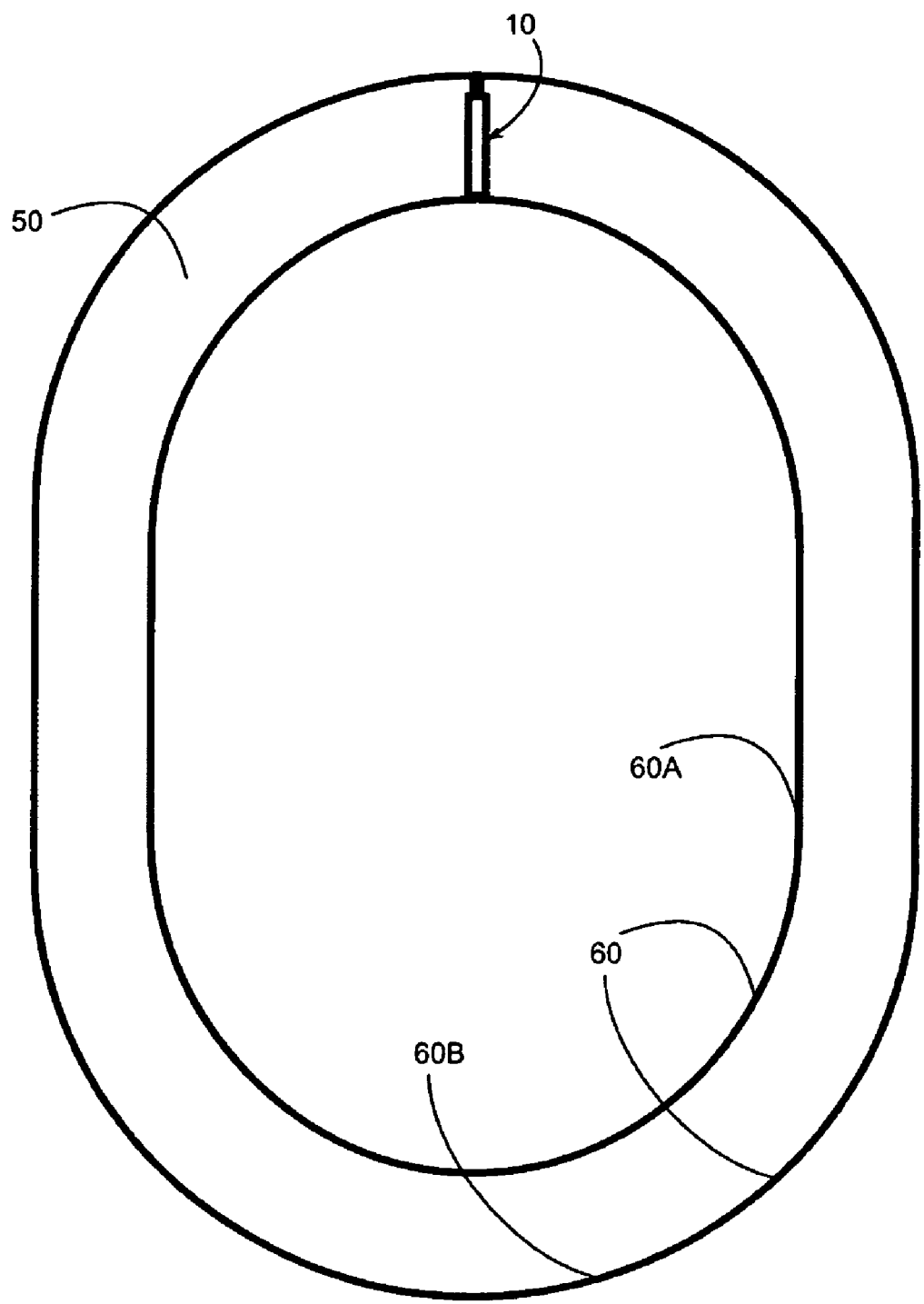
FIG. 5 shows a schematic view of an oval running track and placement of an automatic ground surface dryer.

FIG. 5 shows another embodiment wherein the ground surface 50 is an oval running track wherein the boundaries 60 comprise the inside and outside walls of the track.

The frame 20 of the automatic ground surface dryer 10 may have any structure and dimensions as are appropriate to the size and configuration of the ground surface 50 to be dried, in keeping with the principles described herein. The frame 20 may further be composed of any material or combination of materials as are appropriate to serve its functions as described herein, and in particular to support the weight of the other components mounted thereto and to withstand the mechanical and thermal stress created by their operation. For illustrative purposes only, the frame 20 is shown in FIGS. 1 to 4 to be generally rectangular in shape having a longitudinal length that is a substantial fraction of the distance between the back wall 90 and the tennis net 70. It is to be appreciated that the frame may be disposed perpendicularly to the orientation shown in FIGS. 1 to 4 with the other components being likewise reoriented. It is to be further appreciated that the frame 20 may generally be constructed to have any desired size and shape that is suitable for the ground surface 50 to be dried according to the principles described herein. For example, where the ground surface 50 to be dried is an oval running track, as shown in FIG. 5, the frame 20 has a length that is preferably a substantial fraction of the entire width of the lanes of the track.

The support 40 may be any means suitable to support the frame 20 over or adjacent the ground surface 50 to be dried and to facilitate movement of the frame 20 over or along the ground surface 50. For illustrative purposes only, the support 40 in one embodiment is shown in FIGS. 1 to 4 as comprising a number of wheels 100 that are rollable forwardly and backwardly perpendicularly to the longitudinal axis of the frame 20; the forward and backward rolling directions of the wheels 100 thereby define opposing directions of motion of the frame 20 when the automatic ground surface dryer 10 is in use.

In this illustrative embodiment, the support 40 further comprises an extension arm 110 connected to and extending from an end of the frame 20 nearest the back wall 90, and which is generally disposed perpendicularly to the direction of rolling of the wheels 100. The extension arm 110 is mounted at one end thereof to the frame 20 and is coupled at another end thereof to a support rail 120 which is more particularly shown in FIGS. 6 and 7. The support rail 120 may be supported in any suitable manner, including by the ground surface 50 or by mounting to or within the back wall 90 or side wall 80, as the case may be. The support rail 120 extends parallel to and a substantial fraction of the length of the back wall 90 and parallel to the direction of rolling of the wheels. Alternatively, in another embodiment the support rail is disposed along a side of the tennis court wherein the frame is supported by wheels which are rollable between the back wall and the tennis net along a line perpendicular to both.

Figure 6:
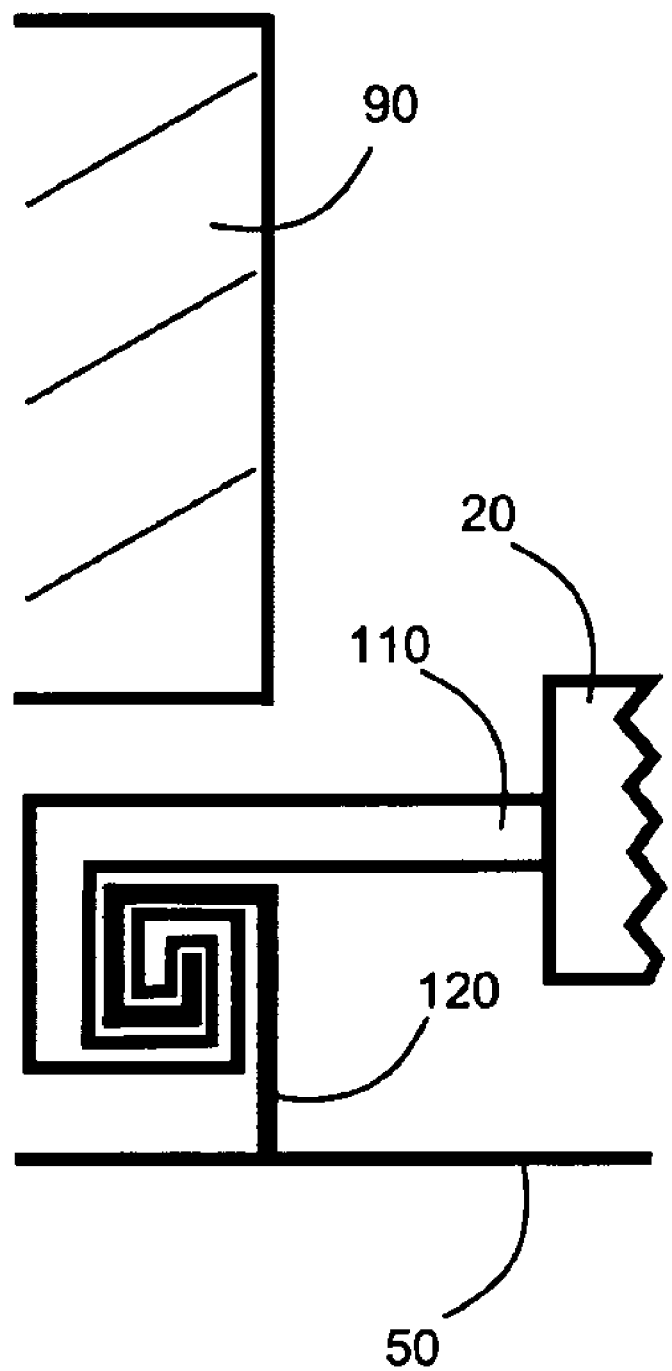
FIG. 6 shows a partial elevation view of an automatic ground surface dryer according to FIG. 1 particularly illustrating the extension arm and support rail according to one embodiment.
Figure 7:
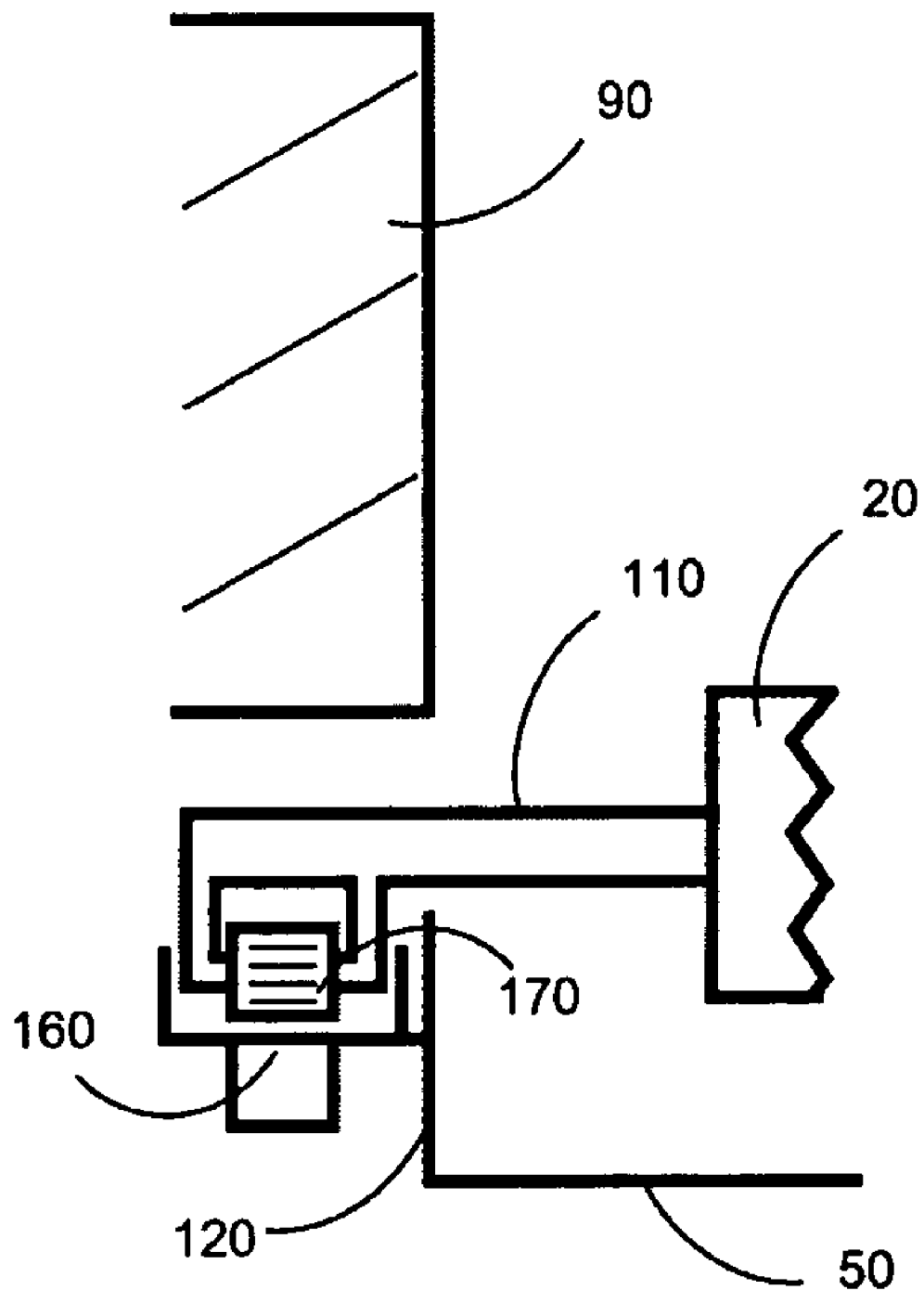
FIG. 7 shows a partial elevation view of an automatic ground surface dryer according to FIG. 1 particularly illustrating the extension arm and support rail according to a second embodiment.

The extension arm 110 and, accordingly, the frame 20 in this embodiment are translatable along the length of the support rail 120 whereby the support rail 120 serves as a guide for the motion of the extension arm 110, and thereby the frame 20, over the ground surface 50. In one embodiment, the extension arm 110 is coupled to the support rail 120 as shown in FIG. 6, wherein an end of the extension arm 110 is wrapped around and seated in a trough provided in the support rail 120. The direction of motion of the frame 20 is thereby restricted by the lengthwise disposition of the support rail 120, and the extent of forward and backward translation of the frame 20 is restricted by the length of the support rail 120. FIG. 7 shows the coupling in another embodiment which is more fully described hereinafter.

The extension arm may also serve as a support for any means, such as wires, to communicate electrical power to devices mounted on the frame, including the drying apparatus, from a source coupled to or adjacent the support rail. The source is selected to provide any appropriate fuel to the automatic ground surface dryer for its operation, including gasoline, electricity, pneumatic or hydraulic fluid, or other fuels known in the art. In one embodiment, the automatic ground surface dryer alternatively comprises a fuel storage means for storing the fuel required by the automatic ground surface dryer to operate.

It is to be understood that the frame 20 may be supported by and movable on any means appropriate for the ground surface 50 to be dried. For example, in one embodiment where the ground surface 50 is a running track, as shown in FIG. 5, the support rail 120 may define the inside perimeter 60A of the oval and may be supported by the stadium wall. Alternatively, in another embodiment, the support rail 120 may define the outside perimeter 60B of the oval. In either embodiment, the support rail 120 describes a closed loop, and the extent of forward and backward translation of the frame 20 is generally indefinite. In other embodiments, the frame 20 may alternatively be supported by any means known in the art other than, or in addition to, the wheels 100, extension arm 110 and support rail 120 described above, including maglev or air cushion (i.e. hovercraft) hovering technologies.

The drying apparatus 30 mounted to the frame 20 comprises any appropriate means for drying the ground surface 50. With reference to FIGS. 1 to 4, in one embodiment, the drying apparatus 30 comprises a squeegee 130 mounted to the undercarriage of the frame 20 disposed substantially parallel to a longitudinal axis of the frame 20. The squeegee 130 is substantially the length of the frame 20, but in other embodiments is alternatively any desired length. The squeegee 130 is disposed so that its longitudinal axis is perpendicular to the direction of motion of the frame 20 when the automatic ground surface dryer 10 is in use. The squeegee 130 is ordinarily in contact with the ground surface 50 when the frame 20 is in motion and the squeegee 130 faces the direction of motion of the frame 20. The squeegee 130 thereby removes water from the ground surface 50. In another embodiment, the drying apparatus 30 has two squeegees mounted on opposite sides of the frame 20, each being configured to remove water from the ground surface 50 when the frame 20 moves in a corresponding direction over the ground surface 50.

Figure 8:
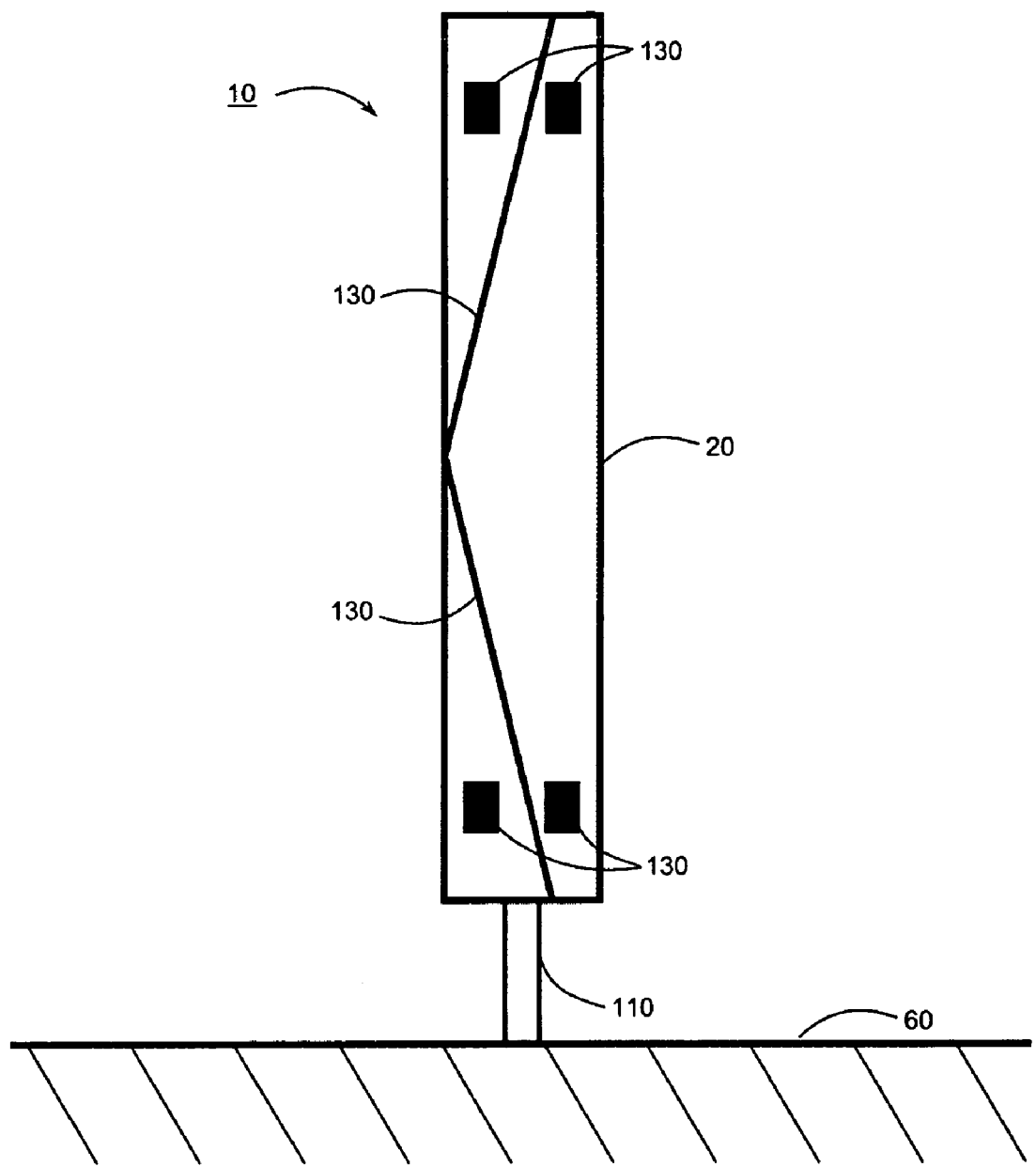
FIG. 8 shows an underside view of an automatic ground surface dryer according to a further embodiment particularly illustrating the plough arrangement of the squeegees.

In one embodiment, where the ground surface 50 to be dried is a tennis court, the squeegee 130 pushes water to a side of the court by the repeated forwards and backwards motion of the frame 20 from one side of the tennis court to the other. In another embodiment, where the ground surface 50 is an oval track, the squeegees 130 are oriented in a plough arrangement, as shown in FIG. 8, so as to deflect water to the sides of the track during the forward motion of the frame 20 (to the left from the point of view of the figure).

Figure 3A:
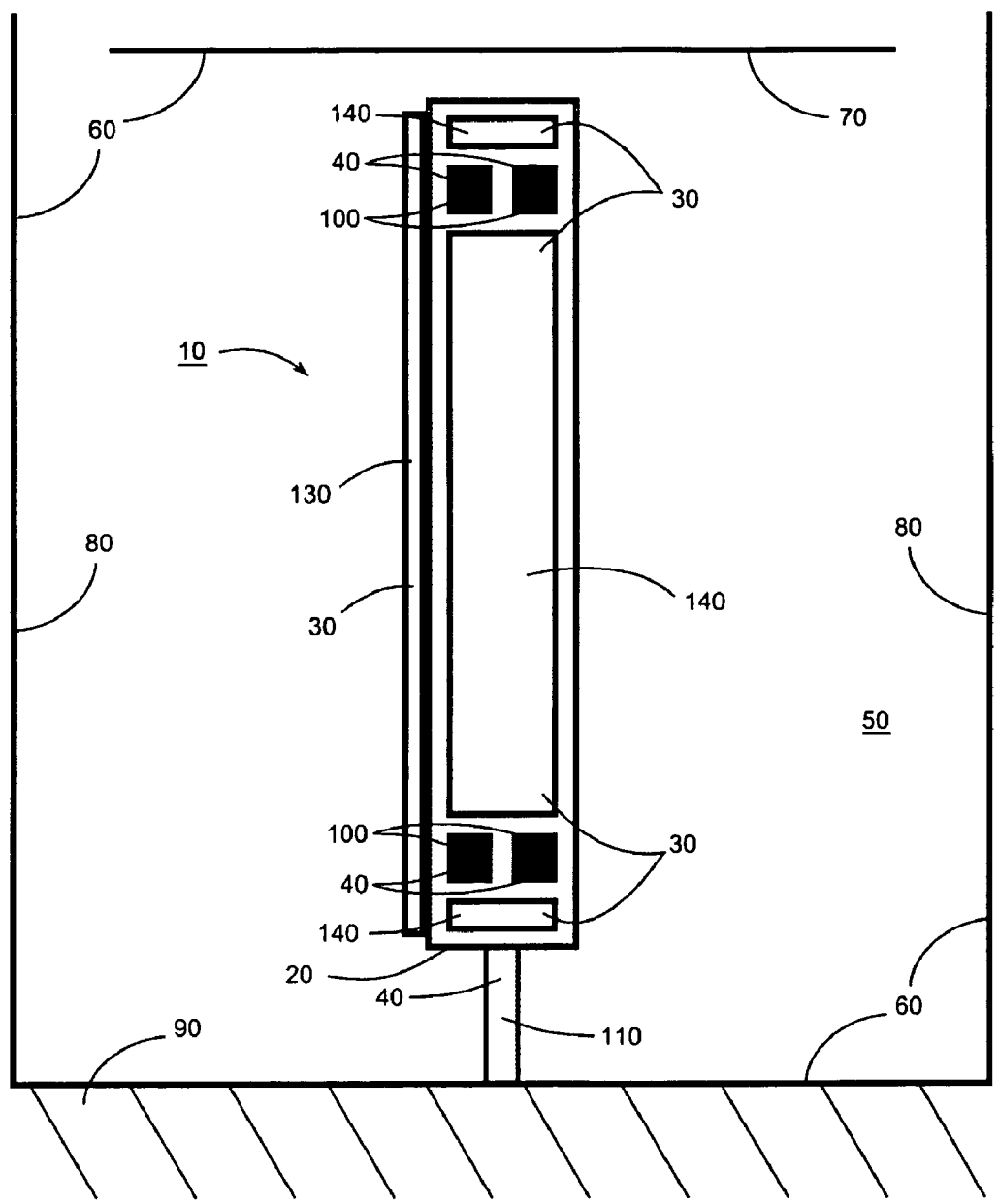
FIGS. 3A & 3B show underside views of two embodiments of an automatic ground surface dryer according to FIG. 1.

With reference to FIG. 3A, in a further embodiment, the drying apparatus 30 alternatively or further comprises a blower 140 mounted to the frame 20. The blower 140 blows air against the ground surface 50 to dry the ground surface 50. The blower 140 has an outlet or outlets adjacent the ground surface 50 and inlets for receiving air. The blower 140 is configured to blow either cold air or warmed air against the ground surface 50. In one embodiment, the blower 140 comprises a single device, whereas in another embodiment it comprises multiple devices operating in concert. The blower preferably blows air over as large an area of the ground surface 50 as possible in order to dry the ground surface 50 as quickly and in as few passes of the automatic ground surface dryer 10 as possible. The blower 140 is powered by any suitable means including, but not limited to, electricity communicated by wires supported by the extension arm 110 as hereinbefore described or by a natural gas supply. In one embodiment, the drying apparatus 30 further comprises an actuator which lifts the squeegee 130 from the ground surface 50 when the blower 140 blows air against the ground surface 50, so that only the squeegee 130 or the blower 140 are operative to dry the ground surface 50 at any given moment. Alternatively, in another embodiment, the drying apparatus 30 is configured to have the squeegee 130 in contact with the ground surface 50 regardless of whether the blower 140 is operating or idle.

Figure 3B:
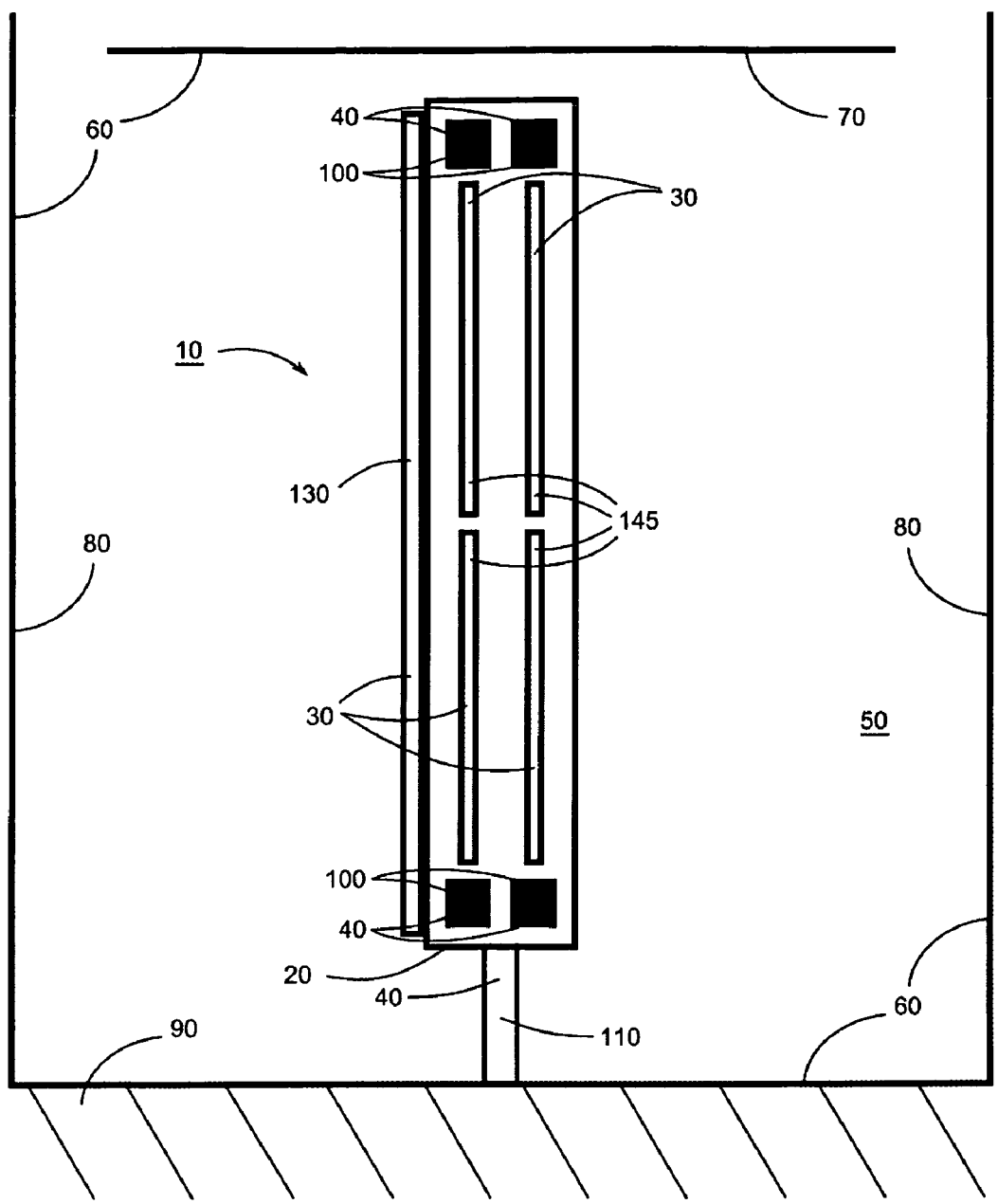
Figure 4:
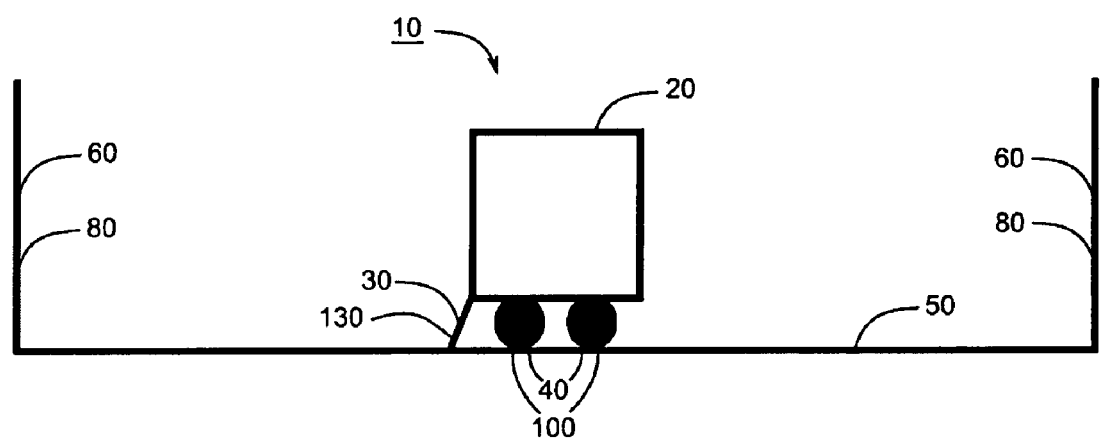
FIG. 4 shows an end view of an automatic ground surface dryer according to FIG. 1.

A second embodiment having an alternative aspect of the drying apparatus 30 is shown in FIG. 3B. In this embodiment, the drying apparatus 30 further comprises a set of heating elements 145 mounted to the frame 20 and disposed above and close to the ground surface 50. The heating elements 145 heat the ground surface 50 when energized thereby drying the ground surface 50. As with the blower described above, the heating elements 145 may be one device or many devices operating in concert, and preferably heat as large an area of the ground surface 50 as possible with each pass of the automatic ground surface dryer 10 in order to dry the ground surface 50 as quickly as possible. The heating elements 145 may likewise be supplied by any suitable energy including electricity or natural gas. The heating elements 145 may be any means to provide heat including ceramic mica rods or sheets wrapped with nichrome or other high resistance wire which radiates heat when energized with a suitable electrical current. Alternatively, the heating elements 145 may comprise gas torches.

In other embodiments, the drying apparatus 30 alternatively comprises any means known in the art for removing water from and drying a surface, including a wet vacuum, a rotating brush or an absorbent roller.

Figure 9:
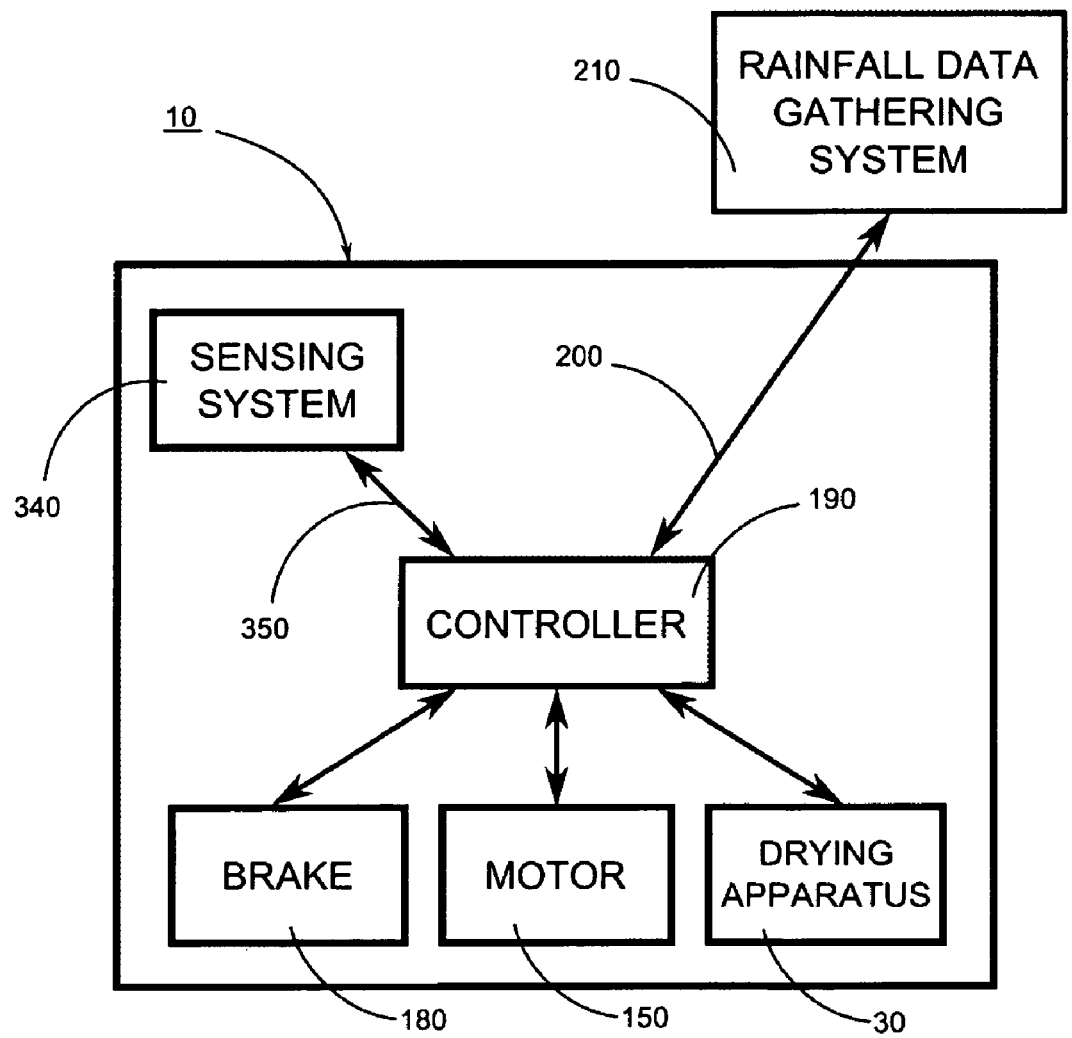
FIG. 9 shows a schematic diagram of an automatic ground surface dryer particularly illustrating the logical connection of certain components.

As schematically indicated in FIG. 9, the automatic ground surface dryer 10 further comprises a motor 150 to move the frame 20 over the ground surface 50. The motor 150 is any device coupled to the frame 20 and capable of imparting motion to the frame 20 as is known in the art, including an electric motor powered by wired or solar power, hydrogen fuel cells, or an internal combustion engine fuelled by methanol, ethanol, propane or diesel. In one embodiment, the motor comprises an AC induction motor available from Baldor Electric Company (www.baldor.com). The motor 150 is mounted to the frame 20 and, in some embodiments having wheels 100 included in the support 40 for the frame 20, the motor 150 is coupled to and drives the wheels 100 thereby imparting translational motion to the frame 20. The motor 150 in this case may be coupled to the wheels 100 by any suitable means including gears or pulleys. In another embodiment, as is illustrated in FIG. 7, the support 40 comprises a support rail 120 which comprises a toothed rack 160 intermeshed with a circular pinion 170 coupled to the extension arm 110, and coupled to and drivable by the motor 150. The motor 150 is thereby operable to impart translational motion to the frame 20 by rotation of the pinion 170 in a rack-and-pinion arrangement as is known in the art. The wheels 100, in this case, are undriven, but otherwise rollable. The automatic ground surface dryer 10 in some embodiments comprises a brake 180 operating in concert with the motor 150 to stop or slow, the motion of the frame 20 when the motor 150 is not moving the frame 20.

With reference again to FIG. 9, the automatic ground surface dryer 10 further comprises a controller 190 coupled to the motor 150 and the drying apparatus 30. The controller 190 controls the motor 150, the brake 180 (if provided) and operates the drying apparatus 30 in response to a rainfall data signal 200 from a rainfall data gathering system 210 which gathers rainfall data. The controller 190 may be any device suitable for driving the motor 150 and operating the drying apparatus 30, including a microcomputer. For example, the controller 190 may comprise a Baldor Nextmove ESB Motion Controller available from Baldor Electric Company (www.baldor.com) coupled to a computer preconfigured to provide the functionality described herein.

The controller 190 may further be configured to operate the drying apparatus 30 by automatically closing an electronic or mechanical switch to supply electricity or other appropriate source of energy to the drying apparatus 30 to thereby operate the drying apparatus 30. Where the drying device is a squeegee and a blower or heating elements, the controller 190 may be configured to iteratively move the automatic ground surface dryer in the direction facing the squeegee thereby removing water from the ground surface and then move the automatic ground surface dryer in the opposite direction and at the same time operate the blower or heating elements to remove water or moisture left behind by the squeegee.

The rainfall data gathering system is remote to the automatic ground surface dryer in one embodiment and is mounted to the automatic ground surface dryer in another embodiment. In various embodiments, it is connected to a weather station, the Internet, and other sources of weather information including rainfall data. In one embodiment the rainfall data gathering system comprises a microcomputer or any other system appropriate to provide the functionality described hereinafter. The rainfall data gathering system generates a rainfall data signal which it communicates to the controller by wired or wireless communication. The rainfall data signal is generated on the basis of the rainfall data gathered by the rainfall data gathering system. According to the rainfall data signal so generated and communicated, the controller drives the motor (and brake, if provided) and operates the drying apparatus when the rainfall data indicates that the ground is wet and it is not presently raining.

Figure 10:
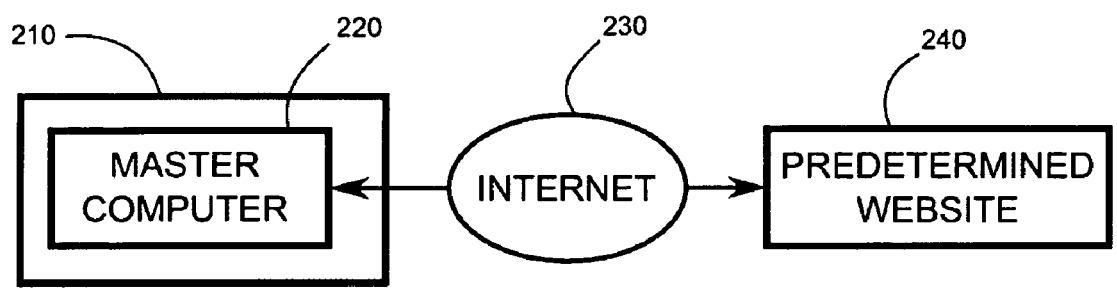
FIG. 10 shows a schematic diagram of a rainfall data gathering system according to one embodiment.

In one embodiment, as particularly shown in FIG. 10, the rainfall data gathering system 210 comprises a master computer 220 connected to the Internet 230 in wired or wireless communication. The master computer 220 is configured to collect rainfall data from a predetermined website 240 (e.g. www.theweathernetwork.com) in a predetermined format. For example, the rainfall data may be downloaded in the form of a rainfall text file which organizes the rainfall information according to airport codes—e.g. YOW, JFK, LAX—indicating the geographical area related to the rainfall information. The rainfall information may take the form of a single letter appended to the airport code indicating the rainfall status. In one embodiment, the letter 'N' indicates that it is not currently raining while the letter 'H' indicates that it has rained. Thus, an entry in the rainfall text file of YOWH would indicate that it has rained in Ottawa, while an entry of LAXN would indicate that it is not raining in Los Angeles. The website may further append the letter 'C' to the end of an 'H' code (e.g. "YOWHC") to indicate that it has rained, but that the website has not yet updated the information to represent current conditions (i.e. the information is stale). The rainfall text file is periodically updated by the provider of the website and is, likewise, periodically downloaded by the rainfall data gathering system. In this manner, the rainfall data gathering system monitors the rainfall conditions in the locality of the ground surface to be dried. Alternatively, the information may be organized and encoded in any appropriate manner known in the art.

Figure 11:
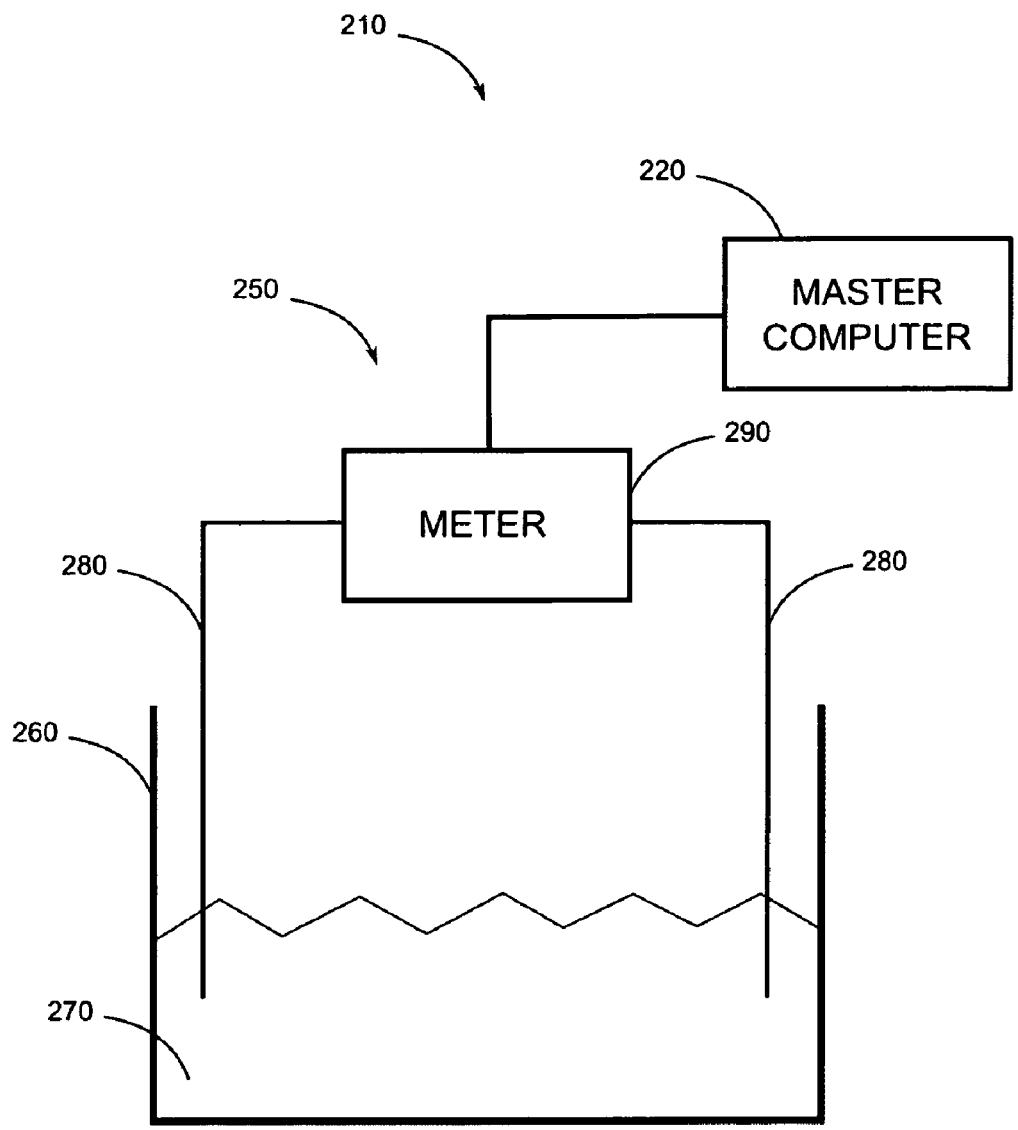
FIG. 11 shows a schematic view of a rainfall data gathering system including a rainfall measuring apparatus according to one embodiment.

Alternatively, or in combination with the embodiment described above, and as particularly shown in FIG. 11, the rainfall data gathering system 210 comprises a rainfall measuring apparatus 250 for measuring the amount of rain which has fallen in the locality of, and therefore near or on, the ground surface 50. The rainfall measuring apparatus 250 comprises a rainfall receptacle 260 which collects rainwater 270 falling near or upon the rainfall data gathering system 210. As the rain falls and the amount of rainwater 270 in the rainfall receptacle 260 surpasses a predetermined level, an electrical circuit is completed. The electrical circuit comprises electrical leads 280 each having one end disposed near corresponding opposite sides of the receptacle and another end connected to a corresponding input of a meter 290. The electrical circuit may be completed by means of the rainwater 270 providing an electrical path between the electrical leads 280 connected to or disposed in the receptacle; chemicals may be added to the rainwater 270 to render it more conductive for this purpose. The electrical circuit may be any appropriate circuit for determining the closing of the circuit, such as a DC electricity source and a resistor in series with the aforementioned electrical leads 280, wherein the meter 290 is a voltmeter or ammeter which measures either the potential drop or current across the resistor. Alternatively, the meter 290 is an ohmmeter which measures the resistance of the electrical circuit.

Figure 12:
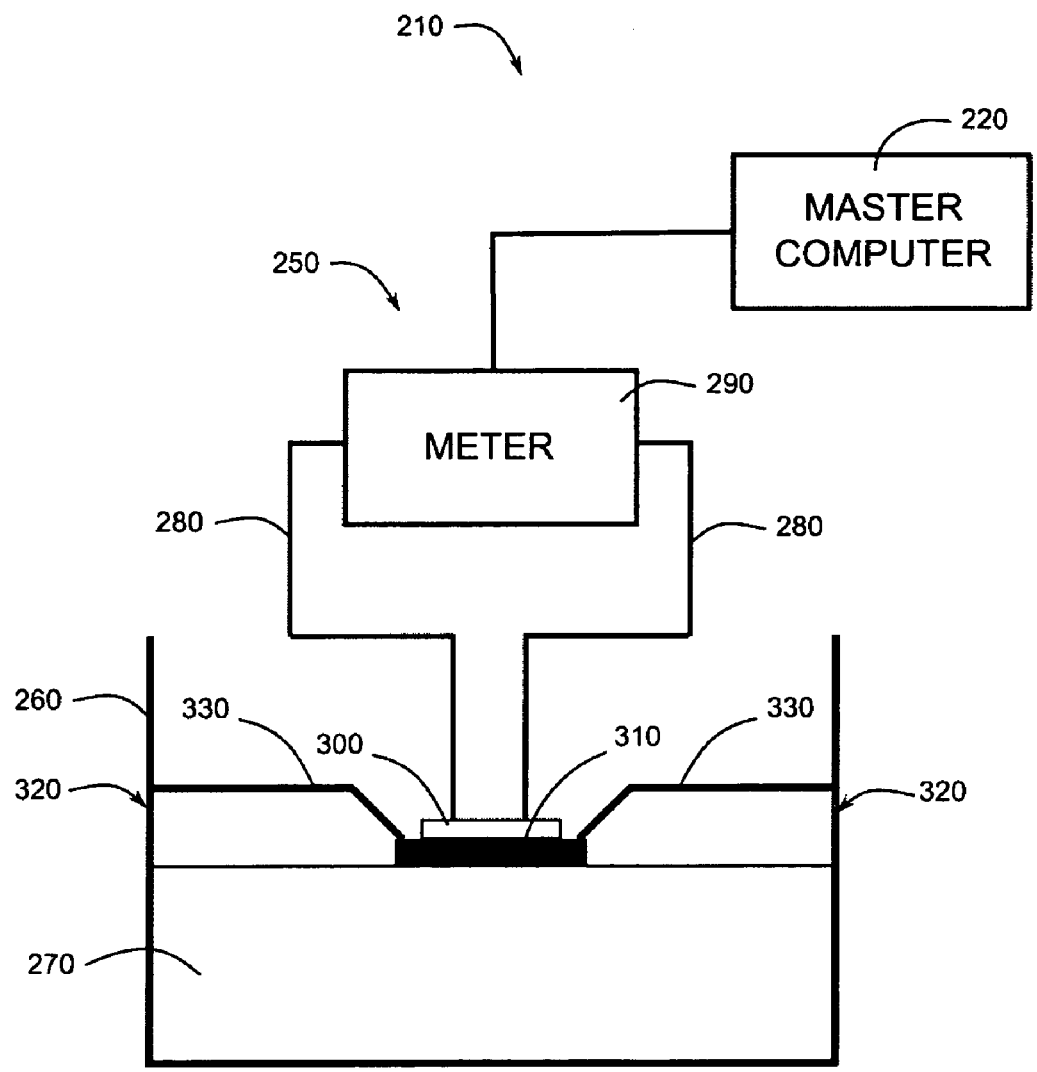
FIG. 12 shows a schematic view of a rainfall data gathering system including a rainfall measuring apparatus according to another embodiment.

In an alternative embodiment, and as shown in FIG. 12, the electrical circuit may be completed by a metal slug 300 supported on the surface of the rainwater 270 by a float 310 whose vertical motion in the receptacle 260 is guided by vertical slots 320 in the receptacle 260 on opposite sides of the float 310 and configured to receive support arms 330 extending laterally from opposite and corresponding sides of the float 310. In this case, the vertical slots 320 also serve to allow rainwater 270 to escape from the receptacle 260 preventing overflow of the receptacle 260 or excessive upward force by the float 310 through the metal slug 300 to the electrical leads 280 when the rainwater 270 in the receptacle 260 exceeds a predetermined level. As the rainwater 270 level increases the float 310 rises in the receptacle 260 bringing the metal slug 300 into electrical contact with the electrical leads 280 when the rainwater 270 level reaches a predetermined level. The electrical leads 280 in this case are sufficiently sturdy and durable to make good contact with the metal slug 300. Furthermore, the metal slug 300 is any piece of metal that has good conductivity (e.g. copper). The float 310 may be made of any suitable material with good buoyancy including plastic.

In these embodiments, the receptacle 260 may further have a tiny hole in its bottom which allows the slow leakage of water from the receptacle 260. In this manner, once the electrical circuit is completed either by the rainwater 270 of the first embodiment, the metal slug 300 of the second embodiment, or by any other appropriate means, and it continues to rain, the rate of leakage from the tiny hole is insufficient to lower the water level sufficiently to cause the electrical circuit to be broken (e.g. by the lowering of the rainwater itself or by the corresponding lowering of the metal slug). However, the rate of leakage is sufficient to lower the water level thereby breaking the electrical circuit once it stops raining. In this manner, the rainfall data apparatus 250 is configured to sense when it is raining and when it is not raining. The rainfall data apparatus 250 may further have one or more rainwater collectors to collect rainwater and channel it into the receptacle.

Furthermore, in these embodiments, the rainfall data gathering system 210 further comprises a master computer 220 which monitors the electrical circuit by means of the meter 290 and which causes a rainfall data signal indicating that it has started to rain to be transmitted to the controller when the electrical circuit is completed. The rainfall data signal may be communicated by any appropriate means as herein described or otherwise known in the art, including wires or wireless communication. For example, the master computer 220 may comprise a microcomputer running Labview™ by National Instruments controlling an ohmmeter (or voltmeter/ammeter and resistor circuit described above) with GPIB capabilities obtained from Agilent Technologies (www.agilent.com), in which case the master computer is connected to the meter through a GPIB link.

In an embodiment combining both of the embodiments described above, rainfall data is collected both from a predetermined website and a local rainfall measuring apparatus as described above. In this case, the rainfall data gathering system may be configured to transmit a rainfall data signal indicating that it has rained to the controller only if both the rainfall data received from the predetermined website and from the local rainfall measuring apparatus indicate that it has rained.

The rainfall data signal is transmitted by the rainfall data gathering system to the controller by any appropriate means. In one embodiment, the rainfall data signal is transmitted by means of a rainfall data signal text file commonly accessible through a network to which both the controller and rainfall data gathering system are connected. In this embodiment, the rainfall data gathering system updates the rainfall data signal text file to indicate that it has started to rain, that it is not presently raining, or to provide any other needed information. In this case, the rainfall data signal comprises a text message contained in the rainfall data signal text file which is suitable to communicate the needed information between the rainfall data gathering system and the controller. In one embodiment the rainfall data signal text file comprises one line of text (i.e. which is repeatedly overwritten). In one embodiment where the rainfall data gathering system measures rainfall by means of the rainfall measuring apparatus, as described above, the rainfall data gathering system writes the meter output (e.g. voltage, resistance, current) as received from the master computer to the rainfall data signal text file; the controller then determines the rainfall conditions from the meter output. In another embodiment, the rainfall data gathering system writes a '0' to the rainfall data signal text file if it is not raining and a '1' if it is raining. In a further embodiment, the rainfall data gathering system writes the amount of rainfall to the rainfall data signal text file when it has rained. In each case, the controller then reads the rainfall data signal text file periodically and operates the automatic ground surface dryer according to the current conditions as indicated by the text message in the rainfall data signal text file.

In one embodiment, the controller operates the automatic ground surface dryer only when it receives a rainfall data signal from the rainfall data gathering system which indicates that it has started to rain and subsequently receives another rainfall data signal which indicates that it is no longer raining. In such a case, the controller does not operate the automatic ground surface dryer when consecutive rainfall data signals indicate that it is not raining (i.e. a "not raining" signal followed by a "not raining" signal), that it has only begun to rain (i.e. a "not raining" signal followed by a "raining" signal), or that it is still raining (i.e. a "raining" signal followed by a "raining" signal). The controller operates the automatic ground surface dryer only when consecutive rainfall data signals indicate that it has started to rain but it is no longer raining (i.e. a "raining" signal followed by a "not raining" signal). The rainfall measuring apparatuses described above may be further configured to provide that the electrical circuit is closed while it is raining but opens once it is no longer raining (e.g. by providing the apparatus with a blower or hotplate to dry the receptacle once the rain has stopped in addition to or as an alternative to the tiny hole).

In one embodiment, the controller further comprises a user interface displaying to a user the rainfall data transmitted to the controller by the rainfall data gathering system. The controller interface indicates when it has rained within a preset time (e.g. the past 30 minutes), in which case the user may enter a password activating the automatic ground surface dryer. The automatic ground surface dryer then commences its drying function, as described herein. The controller further prompts the user inquiring whether the ground surface to be dried is sufficiently dry, enabling the user to enter a command to deactivate the automatic ground surface dryer. In further embodiments, the controller further enables the user to activate or deactivate the automatic ground surface dryer's drying operation in any event, whether it is has rained or not.

In an alternative embodiment, the controller responds automatically to the rainfall data transmitted to the controller by the rainfall data gathering system. In this case, once the rainfall data signal has been transmitted to the controller that it has started to rain, and subsequently that it is no longer raining, the controller is responsive to operate the automatic ground surface dryer for a predetermined length of time or a predetermined number of operations known to be effective to dry the ground surface.

The automatic ground surface dryer may further or alternatively be configured to automatically draw a tarp over the ground surface when the rainfall data signal indicates that it has begun to rain. The tarp protects the ground surface from the rain and facilitates the subsequent drying of the ground surface. The tarp is drawn from a tarp roll which is disposed adjacent a boundary of the ground surface to be dried, with one end of the tarp attached to a corresponding part of the frame of the automatic ground surface dryer. In this case, the controller operates the motor (and brake if provided), but not the drying apparatus, to move the automatic ground surface dryer over the ground surface and draw the tarp from the roll thereby covering the ground surface when a "not raining" rainfall data signal is followed by a "raining" signal. Once it receives a subsequent "not raining" signal indicating that it has stopped raining, the controller may be configured to operate the automatic ground surface dryer as in a normal drying operation (i.e. including operating the drying apparatus) to remove any water that might have reached the ground surface. The tarp roll may further have a tarp motor and a tarp roll controller which receives and is responsive to tarp signals transmitted by the controller of the automatic ground surface dryer whereby the tarp roll controller operates the tarp motor to unroll or withdraw the tarp corresponding to the movement of the automatic ground surface dryer over the ground surface.

In further embodiments, with reference to FIG. 9, the automatic ground surface dryer further comprises a sensing system 340 mounted to the frame to monitor the frame's (and consequently, the drying apparatus's) location relative to the boundaries of the ground surface and to transmit a position signal 350 indicating such to the controller 190. In such a case, the controller 190 drives the motor 150 in response to both the rainfall data signal 200 from the rainfall data gathering system 210 and the position signal 350 from the sensing system 340. In response to the sensing system 340, the controller 190 controls the movement of the frame to keep the frame within the boundaries of the ground surface to be dried. The position signal 350 from the sensing system 340 indicates to the controller 190 that the frame is adjacent and moving toward a boundary and the controller 190 responds by driving the motor 150 (optionally following braking by the brake 180, if provided) so as to change the direction of motion of the frame.

The sensing system 340 may comprise any system for monitoring the frame's location relative to the boundaries of the ground surface. In one embodiment, the sensing system comprises a global positioning system (GPS). In further embodiments, it comprises a microprocessor which determines the frame's location relative to the boundaries of the ground surface by determining the frame's motion relative to a known starting location of the frame and known locations of the boundaries. The sensing system alternatively or additionally comprises infrared rangers adapted to detect obstacles (e.g. people) in the path of motion of the automatic ground surface dryer. In this way, the automatic ground surface dryer may be configured to operate safely and to avoid trampling someone in its path.

Figure 13:
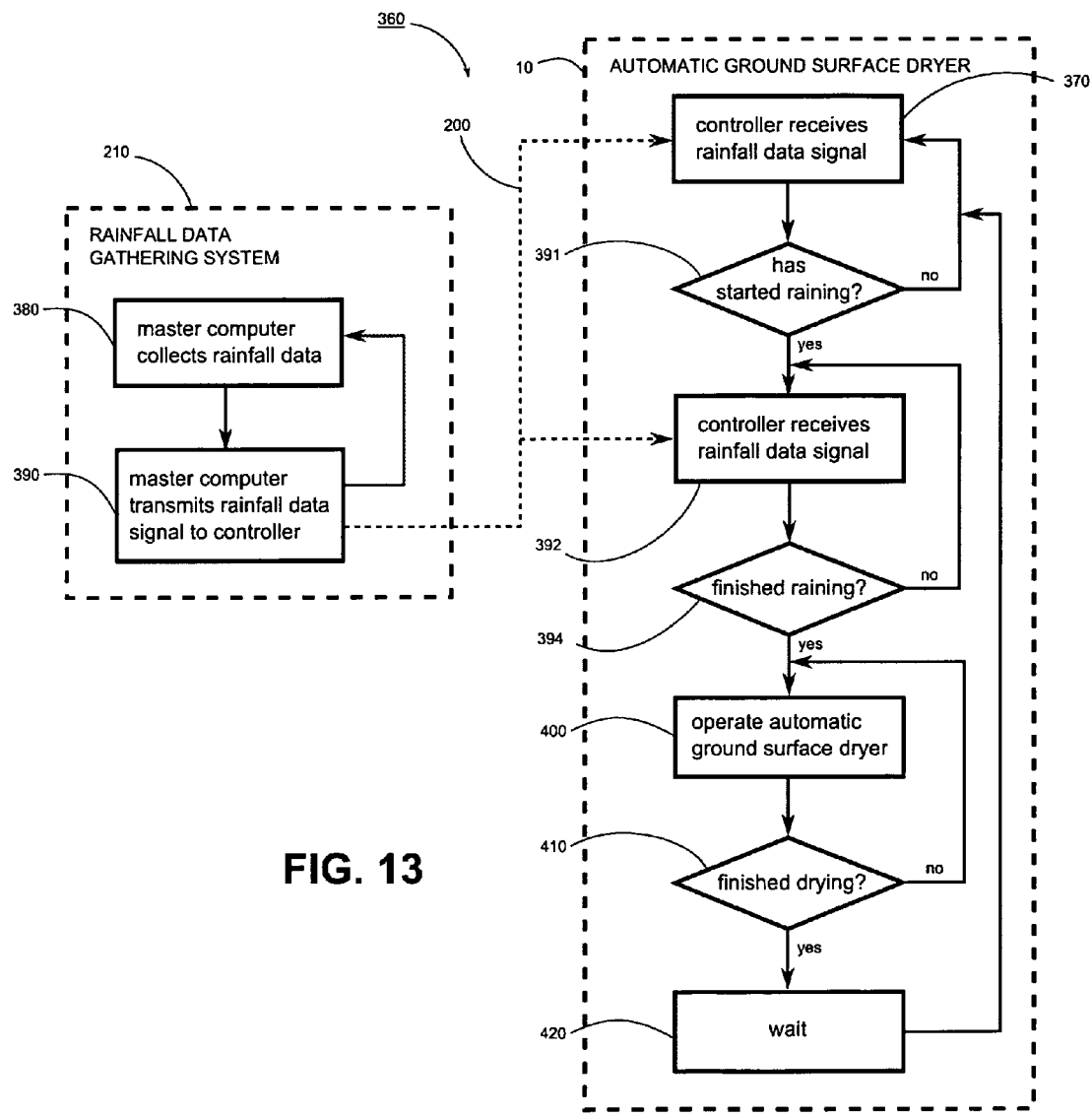
FIG. 13 shows a flowchart illustrating a method according to one embodiment.

In accordance with the foregoing, and with particular reference to FIG. 13, an automatic ground surface dryer 10 may be used to carry out a method 360 of automatically drying a ground surface. Alternatively, any other suitable device may be used to carry out the method. The method is illustrated by the flowchart shown in FIG. 13. In the method 360, the automatic ground surface dryer 10 recursively receives (step 370) a rainfall data signal 200 from a rainfall data gathering system 210. The rainfall data gathering system 210 periodically and recursively collects rainfall data (step 380) and transmits (step 390) a rainfall data signal 200 to the automatic ground surface dryer 10. If the rainfall data signal 200 does not indicate that it has started to rain, the automatic ground surface dryer 10 continues to periodically receive rainfall data signals 200. If the rainfall data signal 200 so received indicates that it has started raining (step 391) and a subsequent rainfall data signal received by the controller (step 392) indicates that it is finished raining (step 394) (i.e. it is no longer raining), the automatic ground surface dryer is operated (step 400) and is automatically moved over the ground surface to dry the ground surface in response to the rainfall data signal 200, as described hereinbefore. Once the automatic ground surface dryer 10 is finished drying the ground surface (step 410) (e.g. by operating for a predetermined length of time or number of passes/operations), the automatic ground surface dryer 10 then waits (step 420) for a predetermined length of time before receiving (step 370) further rainfall data signals 200. The automatic ground surface dryer 10 operates recursively in this fashion until stopped by a user.

The automatic ground surface dryer may receive the rainfall data signal from the rainfall data gathering system by any appropriate means including wireless communication or wired communication, or by shared access to a data file on a network. A controller of the automatic ground surface dryer is configured to drive a motor in response to the rainfall data signal to thereby move the automatic ground surface dryer over the ground surface, and to operate a drying apparatus to dry the ground. Driving the motor may drive wheels to thereby move the automatic ground surface dryer. Alternatively, the motor may drive a pinion coupled to an extension arm of the automatic ground surface dryer, the pinion being intermeshed with a rack of a support rail for guiding the motion of the automatic ground surface dryer, thereby imparting translational motion to the automatic ground surface dryer in a rack-and-pinion arrangement known in the art.

The drying apparatus may dry the ground surface by means of any of a squeegee, a blower, and heating elements as described above. Alternatively, a wet vacuum or any alternative described above or otherwise may be used to dry the ground surface. Automatically moving the drying apparatus may further comprise the step of receiving, from a sensing system, a position signal indicating the drying apparatus's location relative to boundaries of the ground surface; the controller would then drive the motor in response to the position signal from the sensing system as well as the rainfall data signal from the rainfall data gathering system. The sensing system monitors the location of the automatic ground surface dryer's frame (and, consequently, the drying apparatus) relative to a boundary of the ground surface to be dried. The ground surface may be a tennis court and have boundaries as described above. The controller may drive the motor so as to change the direction of motion of the frame when the position signal indicates that the frame is adjacent a boundary. The sensing system may be any of the systems described above.

Figure 14:
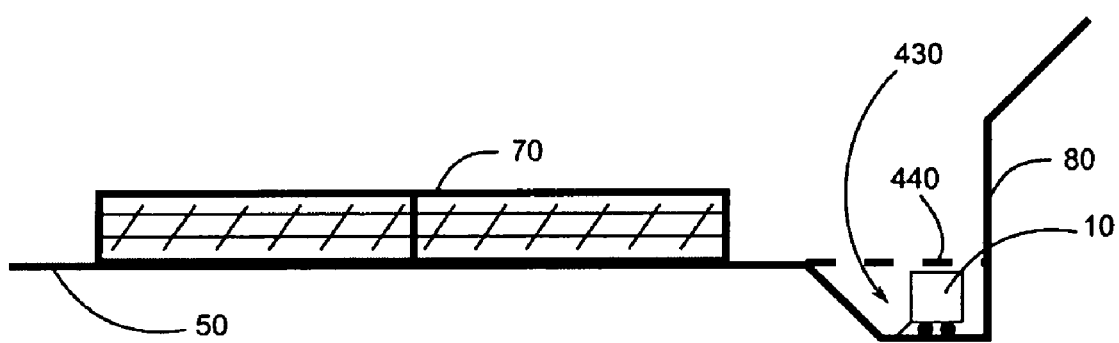
FIG. 14 shows a profile view of a storage well and sliding door for use with an automatic ground surface dryer.

With reference to FIG. 14, the automatic ground surface dryer 10 may further be provided with a storage well 430 recessed into the ground surface 50 to be dried. The storage well 430 may further have a sliding door 440 to enclose the storage well 430 presenting a flat surface when the storage well 430 is closed, thereby quickly and easily storing and concealing the automatic ground surface dryer 10. In the case where the ground surface 50 to be dried is a tennis court, the storage well 430 may be disposed on a side of the tennis court adjacent the stadium or side 80 of the court.

With the foregoing exemplary embodiments having been disclosed, it will be apparent to those skilled in the art that various changes and modifications can be made to appropriately suit the needs and objectives of another application and still achieve the advantages of the invention; all such changes and modifications are intended to fall within the scope of the invention as defined by the claims that follow.

What is claimed is:

1. An automatic ground surface dryer for automatically drying a ground surface, the automatic ground surface dryer comprising:
   a frame;
   a drying apparatus mounted to the frame to dry the ground surface;
   a support mounted to the frame to support the frame and facilitate movement of the frame over the ground surface;
   a motor coupled to the frame and the support to move the frame over the ground surface; and
   a controller coupled to the motor and the drying apparatus to drive the motor and to operate the drying apparatus in response to a rainfall data signal from a rainfall data gathering system which gathers rainfall data,
   wherein the controller automatically drives the motor and operates the drying apparatus when the rainfall data indicates that it has rained and that it is not presently raining, and
   wherein the rainfall data gathering system comprises a master computer which downloads the rainfall data in a predetermined format from a predetermined Internet source.

2. The automatic ground surface dryer according to claim 1 wherein the predetermined format is a text file.

3. The automatic ground surface dryer according to claim 1 wherein the rainfall data gathering system further comprises a rainfall measuring apparatus for measuring rain which has fallen near or on the ground surface.

4. The automatic ground surface dryer according to claim 3 wherein the master computer further receives the rainfall data from the rainfall measuring apparatus.

5. The automatic ground surface dryer according to claim 1 wherein the drying apparatus comprises a squeegee or a wet vacuum.

6. The automatic ground surface dryer according to claim 5 wherein the drying apparatus further comprises a blower or heating elements.

7. The automatic ground surface dryer according to claim 1 further comprising a sensing system mounted to the frame to monitor the frame's location relative to boundaries of the ground surface and to transmit a position signal to the controller, wherein the controller drives the motor in response to both the rainfall data signal and the position signal.

8. The automatic ground surface dryer according to claim 7 wherein the controller drives the motor so as to change the direction of motion of the frame when the position signal indicates that the frame is adjacent and moving toward a boundary of the ground surface.

9. An automatic ground surface dryer system for automatically drying a ground surface, the automatic ground surface dryer comprising:
   a frame
   a drying apparatus mounted to the frame to dry the ground surface;
   a support mounted to the frame to support the frame and facilitate movement of the frame over the ground surface;
   a motor coupled to the frame and the support to move the frame over the ground surface;
   a controller coupled to the motor and the drying apparatus to drive the motor and to operate the drying apparatus in response to a rainfall data signal; and
   a rainfall data gathering system for gathering rainfall data and transmitting the rainfall data signal;
   wherein the controller automatically drives the motor and operates the drying apparatus when the rainfall data indicates that it has rained and that it is not presently raining, and
   wherein the rainfall data gathering system comprises a master computer which downloads the rainfall data in a predetermined format from a predetermined Internet source.

10. The automatic ground surface dryer system according to claim 9 wherein the master computer further receives the rainfall data from a rainfall measuring apparatus for measuring rain which has fallen near or on the ground surface.

11. The automatic ground surface dryer system according to claim 9 further comprising a sensing system mounted to the frame to monitor the frame's location relative to boundaries of the ground surface and to transmit a position signal to the controller, wherein the controller drives the motor in response to both the rainfall data signal and the position signal.

* * * * *